Patented Dec. 8, 1931

1,835,998

UNITED STATES PATENT OFFICE

JULIO TÉLLEZ GIRON, OF MEXICO, MEXICO

TREATMENT OF PETROLEUM OIL

No Drawing.   Application filed August 18, 1931.   Serial No. 557,941.

The present invention relates to treating a petroleum distillate or shale oil distillate for the production of a menstruum which, by further treatment, may result in the formation of various useful products.

Hereinafter the term "petroleum oil" will be used to embrace both petroleum and shale oils.

In one aspect, the invention is directed to the treatment of a mixture or emulsion of a petroleum distillate and a fermented vegetable material, with actinic rays. While being subjected to said actinic rays, the material may be aerated.

One embodiment of the invention relates to treatment of mineral oil distillate, by aeration in the presence of actinic light at atmospheric temperature, whereby in an early stage there may be produced a product from which a rubber-like material of high quality can be produced. When carried to a further stage there may be produced a product containing a large proportion of higher fatty acids, up to 75-90% of the latter, (from which soap can be produced).

More specifically the invention contemplates the treatment of substantially uncracked petroleum distillates boiling between about 280 and 370° C., and preferably between about 300 and 350° C.) as disclosed herein.

Another phase of the invention is the treatment of the distillates above referred to while intimately associated with a product formed by fermenting hay, straw, sugar cane or bagasse or other similar vegetable matters, whereby if desired, almost total conversion of the hydrocarbons into fatty acids can be accomplished, although the treatment can be stopped at an early stage, if rubber-like material is desired as a final product. Still a further phase is the treatment of hydrocarbons by means of actinic rays and air in the presence of the fermentation product of the character indicated, this treatment being effected preferably at atmospheric temperature and pressure. This may be carried out in direct sunshine.

For the purpose of clearly explaining the invention, I give the following specific example, by way of illustration of the preferred procedure.

To produce a fermentation product, I place into a receptacle, e. g., a cistern, a mixture of about 1000 pounds of water, 200 to 250 pounds of hay (chopped up to pass through a screen having half inch holes), together with 10 to 12 pounds of sugar or an equivalent amount of molasses, or sugar syrup. The receptacle is then covered over and allowed to stand at ordinary temperature say 65 to 75° F.) for about two weeks, to ferment. The fermented material is then preferably strained to remove coarse solid matter, leaving a fermented aqueous liquid product.

1000 pounds of this fermented aqueous liquid product are well mixed with 2000 pounds of uncracked 300° to 350° C. cut of petroleum oil to form an emulsion. This petroleum cut may come from any source.

This mixture or emulsion is then subjected to actinic light such as direct sunshine, while exposed to the air, while at atmospheric temperature, for a sufficient time for all the water to be evaporated. This treatment may produce higher fatty acids from a portion of the oil. This treatment may continue for several days (say 70 to 80 hours of direct bright sunshine, at preferably not below 70° F., and preferably at 85 to 105° F., or higher).

This treatment can be performed cheaply and effectively by causing the emulsion to flow over inclined surfaces, out of doors, in direct sunshine, at say 80 to 85° F., or higher, until all the water in the emulsion has evaporated, by which time a substantial part, say 5% or so, of the high boiling hydrocarbon distillate may have been converted into free fatty acids depending possibly on the character of the oil used.

This treated mixture of the fermented organic material and oil, from which the water has all evaporated, will hereinafter be referred to as a "menstruum" and is now suitable for use in making rubber-like material.

For the production of such rubber-like material, the oily menstruum, which may contain a small percentage of free fatty acids (or after removing the free fatty acids present, if desired) is treated with about 1 to 2% of magnesium carbonate and from 0.5% up to 3 or 4% of sulphur chloride. The latter reagent can be added while the oily mixture (or menstruum) is at room temperature or at normal body temperature, and does not require extraneous heating, in fact it will heat up due to the heat of reaction. This produces a rubbery material which can be worked up into various products, such as automobile inner tubes and tires, in the usual way.

The above is merely a specific example of how the invention may be applied to specific materials. Those versed in the art will readily perceive how to carry out the process with other raw materials and under other operating conditions.

When it is not desired to use the menstruum for producing such a rubbery material, but for making soap, instead of stopping as soon as the water has been evaporated, the treatment may be continued for a further period of 90 to 100 hours in direct sunshine (or about twice as long, more or less, in partly cloudy weather), to convert 75 to 85% or even more of the hydrocarbon of the heavy hydrocarbon oil into free high molecular fatty acids.

The proportions, times, temperatures and steps, as well as the materials may be varied, in accordance with the requirements of a specific case.

One of the raw materials used is the substantially uncracked 280 to 370° C. cut (or 300 to 350° C. cut) from the petroleum. Where such distillate is being produced by the oil companies, it can be purchased on the market. Petroleum distillates of about this boiling range are now on the market, as "medium" automobile motor oil, but many of such oils examined, were found to contain a substantial percentage of cracked products, and (apparently for that reason) do not operate well in my present process, and do not emulsify readily with the fermented aqueous vegetable material. The presence of even small amounts of cracked hydrocarbon, I regard as objectionable, but the invention is not restricted to the absolute absence of uncracked products.

I will now describe, in detail, the preferred procedure, starting, as is preferred, with a crude mineral oil (after the usual treatments to remove water, mud, etc.).

A desirable step preliminary to my new treating process is a distillation of petroleum or other mineral oils to produce a cut consisting of uncracked high boiling fractions. Such a treatment, it will be noted, is in itself, contrary to the usual "cracking" operation. As the starting material, I preferably use crude oil, or at any event, an oil which has not been subjected to a distillation or other treatment in which cracking has occurred. In order to accomplish this result, the petroleum oil (after having distilled off the light products such as gasoline and kerosene, if present therein, all as is common practice in the art), is run into a still and the distillation carried on by heating while introducing steam into or over the oil. The steam is preferably superheated and may be heated to any desired temperature, depending upon the density and character of the distillate required. Superatmospheric pressure is not necessary and in fact is undesired, and the steam carries the oil vapors away to a condenser as fast as they are generated and thereby eliminates cracking of the vapors by preventing any prolonged contact with the highly heated interior surface of the still. As a result, a large yield of high boiling fractions is obtained.

In this process, any uncracked petroleum oil or shale oil can be employed. I usually prefer an asphalt base oil, which oil generally contains more of the fractions that I desire, or semi-asphalt base oil, although a paraffin base oil can be employed, or a shale oil. The presence of small or large proportions of naphthenes in the oils, does not interfere in the treatment by the present process.

I give as the preferred mode of carrying out this step, the following illustrative example. The crude petroleum or shale oil (e. g. a Mexican crude) is put into a still, and heated up to about 280–300° C., dry steam being blown into or over the oil if desired, during this step, or during the last portion of this step, to quickly carry away the vapors to a condenser, and thereby prevent cracking. Any distillate produced during this step can be collected in one or several cuts, for use as petroleum ether, gasoline, kerosene, etc., these distillates are considered as by-products of my process. I then preferably pull a vacuum of say 3 to 5 pounds on the still, and continue the heating while passing steam (preferably dry) through the oil or through the vapor space in the still, to prevent cracking. The vapors evolved are condensed (separately from those given off in the earlier stage) until the oil is at about 340 to 370° C. (preferably about 345 to 350° C.). This cut, 280 to 370° C. and preferably 300 to 350° C., constitutes the preferred uncracked high boiling hydro carbon fraction selected for further treatment. When carrying out the process as here described, the vacuum should best not exceed 5 pounds. The residual oil in the still can be used for fuel, or for any other purpose. The amount of steam per barrel of crude oil introduced during the distillation of the 300 to 350° C. cut can be around 2000 to 4000 cubic feet, introduced at say 120° C. to 150° C. Very good results were secured in certain runs in which the steam was at 130° C., in the line leading into the vacuum still. The presence of such amounts of sulphur, nitrogen and oxygen, as are commonly found in petroleum distillates does not seem to have any injurious effect on the process. In fact any uncracked petroleum oil or shale oil can be used as the starting material, if it contains fractions distilling uncracked between about 300 and 350° C. The steam and/or vacuum, during the distillation step while not absolutely essential, are very preferable and are to assist in rapid removal of the oil vapors from the still, to thereby prevent any cracking, which might be produced by contact of the oil vapors with the hot walls of the still.

The distillates thus procured should be purified and preferably this purification may be accomplished by treatment successively with sulphuric acid and a solution of caustic soda solution, followed by a final washing with water (all of which may be done in the well known manner), after which they are ready for the next step hereinafter described. One object of this purification is to increase the transparency of the oil.

Separately from the above operations, a quantity of vegetable matter such as hay, sugar cane or bagasse is allowed to ferment in water in a suitable container which may be a cistern, for a substantial period, say 12 to 17 days, preferably about 15 days. If hay is used, it has been found desirable to also add sugar thereto. Whatever form of vegetable material is to be used, a fermentable sugar such as molasses, glucose, syrups, fruit sugar, malt sugar, or the like, may be added, if needed. The addition of fermentable sugar in addition to that normally present in hay is an aid to fermentation. After fermentation the product is a thick mass including the decomposition products of the hay or bagasse, etc. I have referred herein to the fermentation of a wet mass comprising vegetable materials such as hay, straw, bagasse, sugar cane and other cellulosic and sugary vegetable materials. In certain of the appended claims the expression "roughage having the general properties of bagasse" is intended to cover the specific substances enumerated and well known equivalents.

This step may be carried out as follows. Hay or straw is chopped up, so that it will pass through a ½ inch mesh screen. To about 20-25 parts by weight of this is added about 1 part of sugar and about 100 parts of water (river water, rain water, etc. are sufficiently pure). The mixture is run into a suitable receptacle such as a cistern or tank and allowed to stand and ferment for about 12 to 18 days, depending on temperature. It is usually advisable to leave a little of a former batch of the fermented material in the cistern to act as a starter. The temperature in a particular case, varied between about 61° F. and 77° F. and the material was sufficiently fermented in about 13 days. It was then taken out and was a black looking, thin mushy mass, having a characteristic fermented odor, and when a sample was subjected to laboratory filtration, about 11% was found to be undissolved solid materials. This material may then be run over a strainer, such as a ⅛ inch mesh screen to take out the more or less of the coarser solid material remaining, which can be discarded or if desired put back with the hay in the next run to act as a "starter". It is to be noted that the fermentation is conducted in the presence of water, and I hereinafter use the term "wet" to indicate the presence of water and not anhydrous liquids. I have hereinafter referred to the strained material as "products of fermentation". Such expression is not intended to cover a single substance, such as alcohol which could be recovered by appropriate steps (neutralization, fractional distillation, rectification and dehydration) from the fermented product, but is intended to cover the major part at least of the several liquid and finely divided constituents of said fermented material.

In other cases, higher temperatures of fermentation, e. g. 80° F. shortened the time, and the amount of undissolved material in the fermented product varied between 8 and 15%. It is not necessary to leave a little of the fermented material in the cistern or fermenting tank, but this is helpful as it seems to act as a "starter" to accelerate the fermentation. This fermentation is preferably conducted in the dark, and in tanks or cisterns having loosely fitting covers, and without aeration. No yeast or other specially prepared ferment organism is necessary. While I prefer to use hay, bagasse or sugar cane, it will be understood that many other kinds of vegetable organic matter, particularly those containing cellulose and sugar, etc., may be used in a similar manner. When using sugar cane or bagasse no added sugar is necessary, although when using bagasse which has had a water-wash during or after the pressing of the cane, a small amount of sugar could be added.

The quantities given in this example can be varied between wide limits. If the sugar is omitted or used only in amounts much less than here stated, the fermentation will be slower.

The addition of the sugar is of particular value in starting incipient fermentation of the cellulose material of the hay. However, it should be understood, that many other kinds of cellulosic and sugary vegetable material which has been fermented while wet, in any known manner may also be satisfactory.

The use of the fermentation products from hay, sugar cane, bagasse or other cellulosic and sugary material, in the process materially improves the yield, (as compared with previously known oxidation processes) in many cases making it possible to obtain nearly the theoretical yield of fatty acids, when the production of the latter is the object of the process, such as for the manufacture of soap as above mentioned. The presence of this fermented material is also of importance in the first or water-evaporation stage of the process.

Measured volumes of the purified 300 to 350° C. hydrocarbon distillate (about 2 parts) and the strained liquid (which may still carry some solid matter) from the fermented vegetable matter (about 1 part) are subjected to a thorough mechanical agitation, at ordinary atmospheric temperature to form an emulsion. In some cases I have accomplished this by using a centrifugal pump as an emulsifier. No added emulsifying agent is necessary.

The proportions of the purified hydrocarbon oil and liquid fermented organic material can be varied between wide limits, but I find the 2:1 ratio to be very satisfactory.

The emulsion is then subjected to treatment (which will be herein considered as taking place in two stages) by actinic light, which may be accompanied by aeration, preferably direct sunshine, in the open air.

The first stage of this treatment can best be performed by cascading the emulsion over horizontal or preferably slightly inclined surfaces (which may be imperforate) to expose it in thin layers to the action of sun and air, at atmospheric temperature.

This treatment is preferably conducted by pumping up the emulsion and showering it over boards, or other surfaces, placed one above another in staggered relation, in the open air (out of doors) with the sun shining directly on the material as it flows over said surfaces. The rate of evaporation of water, etc., will depend on the temperature and amount or intensity of sunshine and perhaps other factors such as the particular oil under treatment. The temperature should be above 70° F. and is preferably much higher, say 85 to 105° F., or even more. The amount and brightness of the sunshine also affects the speed of this action. Higher temperature and more or brighter sunshine accelerate the action. Hence the advisability of carrying out the process in warm sunny climates where the rainfall is low. During the evaporation of the water, there is some oxidation of the hydrocarbon resulting in the formation of some fatty acid, which may amount to about 3 to 7% (average about 5%) by the time evaporation of water is complete. The first stage of the treatment under actinic rays should preferably be continued until all the water in the emulsion has evaporated. The oily liquid will then be somewhat transparent, but somewhat thicker than the original oil and sticky (looking and smelling somewhat like castor oil).

If a rubber-like material is to be produced as the final product, the actinic ray treatment can be stopped when the water has all evaporated, at which time the product may contain about 5% of the free fatty acids. On the contrary if soap is to be formed as the final product, the aeration and sun treatment can be continued for, say another 90 to 100 hours or more, in bright sunshine, or 180–220 hours or more in cloudy weather, when it will be found that 75 to 90% of the uncracked hydrocarbon oil distillate has been oxidized to fatty acids. This may be referred to as the second stage of the treatment with actinic rays. The temperature may be somewhat lower during this second stage (i. e. after the water has completely evaporated from the mixture), but should preferably not be below 50° F., and may be about the same as in the first part of the process. High atmospheric temperature (about 77° F. or higher) seems to be necessary to start the process while the water is present, but after it has started and after say 5% of the hydrocarbon has been oxidized, the process will continue at somewhat lower temperatures.

The steps of pumping and cascading the material, of course considerably agitates the same and aids in maintaining the oil and aqueous materials in an emulsified state.

The progress of the effect of the actinic rays or oxidation stops as soon as the sunshine ceases or gets weak. Accordingly it is my practice to start the circulating pumps early in the morning soon after sunrise, and to stop them at about sunset, or shortly before.

If the process is being conducted out of doors, and rain begins, the whole mixture under treatment can be pumped to a suitable covered tank, or the apparatus covered, and the process continued after the rain ceases.

After the completion of the first stage the menstruum can be strained through a fine wire strainer, e. g. a ⅛ inch mesh screen, or filtered, before further treatment, to remove constituents insoluble in the oil mixture as well as dirt, dust, etc., which have gotten into the oil during this step. The oil may still carry some solid organic fermented material in suspension and a small amount of other materials left from the fermented organic matter in solution and/or perhaps chemically combined with the oil.

In order to determine when evaporation of the water is complete, specimens of the material being subjected to the actinic rays may be taken and treated with sulfur chloride. As long as water is present in the material the addition of sulfur chloride to the sample will produce a white cloudy effect. When evaporation of water is complete, an addition of sulfur chloride to the specimen will show a dark (nearly blackish) reaction.

In a particular case it was found that when the operation had been continued for about 74 hours of bright sunshine, the water was completely eliminated and the product contained about 5.2% of higher fatty acids resembling oleic acid, and the product seemed to contain complex nitrogen compounds (perhaps substituted ammonia derivatives, amines). It also contained some sulphur compounds (perhaps organic sulfides) which could go gradually oxidized away, on continuation of the aeration in the sunshine. The oil at this stage is (even after laboratory filtration) somewhat darker in color than the original purified oil, but has about the same boiling point range.

The hydrocarbon which has not been converted into fatty acid, also has been so modified that it will readily react with sulfur chloride at room temperature or with elemental sulfur at higher temperature, to form rubbery material, whereas the original uncracked oil distillate would not so react.

At this stage the hydrocarbon is in the proper condition to be converted into rubbery material.

If the fatty acid content of the filtered treated oil is about 5%, it is not necessary and may not be economical to attempt any separation of the fatty acids from the menstruum but the whole mixture can be treated for the production of rubber-like material.

This menstruum from the first stage of the treatment, may be subjected to treatment with magnesium oxide or other metallic oxides and sulphur chloride for conversion into rubbery material. Or to the same end, free sulfur can be added to the menstruum and the mixture heated during or after the mixing operation.

When using sulphur chloride ($S_2Cl_2$ or $SCl_2$) as the sulphurizing agent, I may proceed as follows. I add to the menstruum, which may contain some fatty acids, about 1 to 2% by weight of magnesium oxide or other basic substances such as lime, soda or carbonates of Mg, Ca, Na, etc., the mixture being at about room temperature. This may tend to neutralize residual acidity. Then I add slowly about 0.5% to 5% of the sulphur chloride, while stirring. The sulphur chloride added is based of course on the weight of the menstruum. The stirring is continued until the reaction is over. The mass may heat up to about 80–90° C., by the heat of reaction.

When treating with free sulphur, about 1 to 6% of sulphur depending on the properties desired in the rubbery material, is added, and well mixed and heated, after a good stirring, to about 115–120° C., to form a rubber-like material.

The rubbery material is formed from the menstruum containing the hydrocarbons although the small amount of fatty acids therein may also be converted. The product at the end of the evaporation of the water constitutes the menstruum referred to.

The rubber-like material formed is of good quality, is of high strength, stretch and resiliency. It burns like rubber, and when burned gives an odor like burning rubber. It wears well, is waterproof, is as stable as real rubber, but it is somewhat less sticky and does not always require the addition of fillers such as are generally added to caoutchouc rubber, in the manufacture of various products therefrom.

The sulfur chloride or sulphur can be added step by step. After the sulphurizing operation the resulting rubbery material can be heated, pressed and molded to form artificial rubber-like products of high quality. Thus automobile tire tubes, rubber tubing, shoe heels, etc., can be made. Or by the usual mode of manufacture, tire casings, etc., can be made, all of good quality.

*Formation of fatty acid product*

When it is desired to form soap as the final product, the oxidation, by the mode above given in the second stage, is continued until a major portion of the hydrocarbon of the oil has been converted into fatty acids say 70 to 85% or more. The fatty acids produced may be converted into soap by the addition of alkali and subsequent well known treatment. Alkalies are added after filtration of the final oxidized oil and the mixture is boiled or cooked as in the usual soap-making processes.

Another method of control, especially of the second stage, is to make tests, from time to time, to determine the amount of free fatty acid present.

From the above description it will be seen that I have provided a method of preparing a menstruum from petroleum suitable for making rubber-like products or soap and the like, and well adapted to cheaply produce large quantities of these final products. Also, it will be apparent, that many minor changes may be made in the specific procedural details, and it is my intention to be limited in this respect only as may be necessary by the scope of the claims hereto appended. It will be also understood that the fatty acids produced by oxidation can be used for various other purposes, and that they can be separated from the residue of the oil first, if desired, but such separation is not necessary in the uses above given.

In the oxidation process, I have especially stressed the formation of fatty acids. It is understood that other oxidation products may also be formed.

Reference is made to carrying the formation of fatty acids up to 70% or more, for the manufacture of soap. However, oxidized oil material containing a much lower percentage of the fatty acids can be so used. In fact hydrocarbon oil containing any percentage of fatty acids can be treated with alkali to form soap, a part of the free oil being subsequently removed if desired.

Throughout this specification percentages given are by weight unless otherwise stated.

I have spoken of direct sunshine. This is always preferred, but diffused sunlight will operate, although much slower.

Statements of time (hours) as given in this specification, refer to hours of actual bright sunshine. Thus bases on a 10 hour day, 70 hours would be seven whole days. During the first hour or two after sunrise and the last hour or two before sunset, the sunshine is much weaker than in the middle of the day. When the temperature is low, or the sunshine is weak, (i. e. cool, partly cloudy weather or at either end of a sunny day) the reactions go on much slower and the evaporation of water from the mass is slower, requiring two or three times as many hours, or more.

If the process is to be conducted in locations where rain is likely, it is desirable to provide a framework upon which a suitable covering, of the nature of an awning of waterproof canvas or duck, or the like can be put when rain begins. Of course if a few drops of rain or dew get into the oil mixture under treatment, it does no particular harm, since it will soon evaporate when again subjected to sun and air treatment.

I have referred above to carrying out the process in warm climates, in the open air and in direct sunshine. If it is desired to carry out the process in cold climates, or where sunshine is relatively rare, or during a continued rainy spell, the treatment of the oil emulsion can be carried out in a building, heated in any desired manner to the temperatures stated, and artificial actinic light produced by any suitable means, e. g. mercury vapor lamps substituted. Of course this will be much more expensive.

In some cases I have found that the process may be accelerated by subjecting the emulsion to the influence of radio active material during the actinic ray treatment. A convenient way of doing this during the cascading operation may be to form or treat some element or elements of the apparatus with which the emulsion may be associated, with radio active material. For instance the plates over which the emulsion passes in the cascading operation may be coated with some such radioactive material as uranium ore, pitchblende or the like, or they may be formed from a mass containing such materials.

The process of making rubber-like material, and the product of such process, as described herein, are claimed in my copending application filed September 3, 1931.

I claim:

1. A process which comprises fermenting cellulosic and sugary organic material, in water, mixing at least the liquid portion of the fermented material with high boiling point substantially uncracked petroleum oil, to form an emulsion, flowing such emulsion, while being subjected to air and sunshine, over surfaces, in the form of films, until the water is evaporated.

2. A process of forming a menstruum containing oxidation products of hydrocarbons which comprises mixing a steam distilled, substantially uncracked petroleum oil fraction distillate which will distill under atmospheric pressure at above 280° C. and below 370° C., with at least the aqueous portion of the fermentation products of organic material containing a large percentage of cellulose and sugar, fermented in the presence of water; and subjecting the mixture to the action of a gas containing free oxygen while being subjected to concentrated actinic rays at about atmospheric temperature, until oxidation of the hydrocarbon into fatty acids has been started.

3. A process which comprises subjecting a petroleum oil to fractional distillation, collecting a steam distilled, substantially uncracked distillate coming over at between about 280 and 370° C.; fermenting organic material containing cellulose and sugar in the presence of water; mixing the said oil distillate and at least the aqueous portion of the fermented organic material to form an emulsion, cascading said emulsion repeatedly as films over surfaces while in the direct sunshine, and while exposed freely to the air, and while warm, at least until the water has evaporated from the emulsion.

4. A process which comprises fermenting cellulosic and sugary material, in water, to decompose the same, mixing at least the liquid portion of the fermented material with high boiling point petroleum oil, to form an emulsion, flowing such emulsion, while being subjected to air and sunshine, over surfaces, in the form of films until the water has evaporated from the emulsion.

5. In a process of treating petroleum oil, the steps which comprise mixing a substantially uncracked petroleum fraction which would boil under atmospheric pressure between 280–370° C., with at least the aqueous portion of the fermentation products of vegetable matter fermented in water, emulsifying, and subjecting the emulsion to direct sunshine and aeration until the evaporation of the water is substantially complete.

6. A process of treating petroleum oil to produce a menstruum suitable for making rubber which comprises intimately mixing a distillate of petroleum composed of substantially uncracked hydrocarbons of high molecular weight having substantially the viscosity of medium lubricating mineral oil with at least the aqueous portion of the fermentation products of vegetable matter fermented in water; and subjecting the mixture to intimate contact with air while exposed to sunlight, at substantially atmospheric temperature until substantially all the water has evaporated.

7. A process of treating petroleum distillate to produce a menstruum suitable for making rubber, which comprises forming an emulsion by mixing a high-boiling point substantially uncracked hydrocarbon distillate having about the same viscosity as medium lubricating oil with at least the liquid portion of fermented roughage having the general properties of bagasse containing some sugar, fermented in water, and subjecting the emulsion to intimate contact with air in the presence of sunlight, while at about atmospheric temperature, until the water has evaporated.

8. A process of converting hydrocarbons of petroleum oil into a product containing about 5% of fatty acids, and suitable for the manufacture of high grade rubbery material, which comprises selecting a heavy viscous substantially uncracked hydrocarbon distillate, which would distill at atmospheric pressure between about 280 and about 370° C., and subsequently chemically treating the said hydrocarbon, by contact thereof with air together with exposure to direct sunshine, at about atmospheric temperature, and mixed with at least the aqueous portion of the fermentation products of cellulosic and sugary vegetable material fermented in a wet condition.

9. A process of treating petroleum which comprises distilling therefrom a high-boiling point substantially uncracked hydrocarbon distillate which would boil under atmospheric pressure at about 280° to 370° C., fermenting roughage having the general properties of bagasse containing some sugar, with water, mixing at least the liquid portion of the said fermented material with said oil to form an emulsion, and subjecting same to intimate contact with air in the presence of direct sunshine, until the water has evaporated.

10. A process of treating a petroleum oil which comprises mixing a substantially uncracked petroleum hydrocarbon oil of high molecular weight having substantially the viscosity of medium lubricating mineral oil and distilling between about 280 and 370° C., with at least the aqueous portion of the products of fermentation of sugary and cellulosic vegetable matter fermented in water, and subjecting the mixture to intimate contact with air while exposed to sunlight at substantially atmospheric temperature, at least until substantially all the water has evaporated.

11. In the production of a menstruum suitable for the production of a rubbery product form petroleum oil, the herein described step of forming an emulsion by well mixing at least the liquid portion of the fermentation products of vegetable matter consisting largely of cellulosic materials and sugar fermented in the presence of water, with a substantially uncracked viscous petroleum oil distillate substantially all of which would distill under atmospheric pressure between about 280 and 370° C.

12. In the production of a menstruum suitable for the production of a rubbery material from petroleum oil, the herein described steps of well mixing at least the liquid portion of the fermentation products of vegetable matter consisting largely of cellulosic materials and sugar, fermented in the presence of water, with a substantially uncracked viscous petroleum oil distillate substantially all of which would distill under atmospheric presence at between about 280 and 370° C., and aerating such mixture while flowing the same, in thin layers over a surface which emits actinic rays.

13. In the making of an oily menstruum suitable for making rubbery material, the steps of mixing a substantially uncracked viscous petroleum fraction which would boil under atmospheric pressure between 280°–370° C., with at least the aqueous portion of a fermented cellulosic and sugary vegetable matter, emulsifying the mixture and subjecting it to the action of concentrated actinic rays in the presence of air at about atmospheric temperature until about 3 to 7% of fatty acid has been formed by oxidation of the hydrocarbons of said oil.

14. In a process of making a menstruum suitable for the production of rubbery material, the steps which comprise mixing a substantially uncracked petroleum fraction boiling under atmospheric pressure between 280°–370° C., with at least the aqueous portion of the fermentation products of vegetable matter initially containing cellulosic and saccharine matter fermented in the presence of water, emulsifying and subjecting to concentrated actinic rays of an activity at least equivalent to moderate sunlight, and air, for several days.

15. A emulsion composed essentially of a major portion of a substantially uncracked petroleum hydrocarbon oil distilling under atmospheric pressure within the range 280 to 370° C., mixed with a minor portion of an aqueous liquid carrying the fermentation products of cellulosic and sugary vegetable matter.

16. A synthetic oily menstruum suitable for making rubbery material, said menstruum having the properties of the product produced from substantially uncracked petroleum oil which would distill under atmospheric pressure between about 280 and 370° C., by being mixed with at least the aqueous portion of the products of fermentation of cellulosic and sugary material in water, and such mixture being aerated in direct sunshine at high atmospheric temperature until the water is evaporated.

17. A synthetic menstruum suitable for making rubbery material, obtained from uncracked petroleum oil of substantially the viscosity of medium lubricating oil and at least the liquid portion of vegetable matter fermented in a wet state, as initial ingredients, nearly all of which menstruum would distill under atmospheric pressure between about 280° and 370° C., said menstruum having a viscosity greater than that of the initial petroleum oil, said product also having the characteristic odor and appearance of castor oil, which product contains at least the part of the fermented vegetable matter which does not voltailize by long exposure to the atmosphere at atmospheric temperature, and which product resembles caoutchouc in that when sulphurized and burned it gives an odor similar to that of burning rubber, and in that it is converted into a strong tenacious stretchy wear-resisting rubbery material when reacted upon with sulphur or sulphur chloride.

In testimony whereof I affix my signature.

JULIO TÉLLEZ GIRON.

CERTIFICATE OF CORRECTION.

Patent No. 1,835,998.                                       Granted December 8, 1931, to

JULIO TELLEZ GIRON.

It is hereby certified that error appears in the printed specification of the above numbered patent requiring correction as follows: Page 1, line 29, before the word "and" second occurrence and line 62, before "say" insert the first parenthesis mark (; page 5, line 12, for "go" read be; page 7, line 68, claim 11, for "form" read from; line 88, claim 12, for presence" read pressure, and line 118, claim 15, for "A" read An; page 8, line 22, claim 17, for the misspelled word "voltailize" read volatilize; and that the said Letters Patent should be read with these corrections therein that the same may conform to the record of the case in the Patent Office.

Signed and sealed this 1st day of March, A. D. 1932.

(Seal)

M. J. Moore,
Acting Commissioner of Patents.